United States Patent
Yin et al.

(10) Patent No.: US 8,553,777 B2
(45) Date of Patent: Oct. 8, 2013

(54) METHOD AND APPARATUS FOR SLICE ADAPTIVE MOTION VECTOR CODING FOR SPATIAL SCALABLE VIDEO ENCODING AND DECODING

(75) Inventors: Peng Yin, West Windsor, NJ (US); Jill MacDonald Boyce, Manalapan, NJ (US); Purvin Bibhas Pandit, Franklin Park, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1530 days.

(21) Appl. No.: 11/887,808

(22) PCT Filed: Mar. 20, 2006

(86) PCT No.: PCT/US2006/009915
§ 371 (c)(1),
(2), (4) Date: Oct. 2, 2007

(87) PCT Pub. No.: WO2006/113019
PCT Pub. Date: Oct. 26, 2006

(65) Prior Publication Data
US 2009/0074070 A1 Mar. 19, 2009

Related U.S. Application Data

(60) Provisional application No. 60/671,257, filed on Apr. 14, 2005.

(51) Int. Cl.
*H04N 7/12* (2006.01)
*H04N 7/50* (2006.01)

(52) U.S. Cl.
CPC ..................................... *H04N 7/50* (2013.01)
USPC ................. 375/240.16; 375/240; 375/240.01; 375/240.12; 375/240.13; 375/240.14; 375/240.15; 375/240.17

(58) Field of Classification Search
None
See application file for complete search history.

(56) References Cited

U.S. PATENT DOCUMENTS

| | | | |
|---|---|---|---|
| 6,292,512 B1 * | 9/2001 | Radha et al. | 375/240.1 |
| 6,571,017 B1 * | 5/2003 | Boon | 382/236 |
| 2002/0150164 A1 | 10/2002 | Felts et al. | |
| 2004/0057517 A1 | 3/2004 | Wells | |
| 2004/0057518 A1 * | 3/2004 | Knee et al. | 375/240.16 |
| 2006/0013306 A1 * | 1/2006 | Kim et al. | 375/240.12 |
| 2008/0304567 A1 * | 12/2008 | Boyce et al. | 375/240.16 |

FOREIGN PATENT DOCUMENTS

| | | | |
|---|---|---|---|
| WO | 2004/114672 A1 | | 12/2004 |
| WO | WO2004114672 | * | 12/2004 |

OTHER PUBLICATIONS

Barbarien et al., Motion and Texture rate-allocation for prediction-based scalable motion-vector coding, Dec. 2004.*

Barbarien et al., "Motion and Texture Rate-Allocation for Prediction-Based Scalable Motion-Vector Coding", Signal Processing Image Communication, Deparment of Electronics and Information Processing, pp. 315-342.

(Continued)

*Primary Examiner* — Faruk Hamza
*Assistant Examiner* — Aixa A Guadalupe Cruz
(74) *Attorney, Agent, or Firm* — Robert D. Shedd; Guy H. Eriksen

(57) ABSTRACT

There are provided spatial scalable video encoder and decoders and corresponding methods for scalable video encoding and decoding. A method for spatial scalable video encoding includes selecting between scalable coding and non-scalable coding of motion vectors on a slice basis.

18 Claims, 10 Drawing Sheets

(56) References Cited

OTHER PUBLICATIONS

Hsieh et al., "A Hybrid Approach with Drift Minimization and Correction for a Layered H.263 CODE", National Taiwan University, XP-000908409, Taipei, Taiwan.

Mehaoua et al., "An Adaptive Early Video Slice Discard (A-ESD) Scheme for Non Guaranteed ATM Services", International Conference on Information, Communications and Signal Processing, ICIS '97, Singapore, Sep. 9-12, 1997, IEEE.

Yin, P. et al., "Complexity Scalable Video Codec", ITU-T Video Coding Experts Group (ITU-T SG16 Q.6) VCEG-X06, Oct. 2004.

Barbarien, J. et al., "Scalable Motion Vector Coding", Electronics Letters, IEE Stevenage, GB, vol. 40, No. 15, Jul. 22, 2004, XP006022395.

Hsieh, S. J. et al., "A Hybrid Approach With Drift Minimization and Correction for a Layered H.263 Codec", IEEE Transactions on Consumer Electronics, IEEE Service Center, New York, NY, US, vol. 45, No. 2, May 1999, pp. 361-371, XP000908409.

Mrak, M. et al., "Scalable Generation and Coding of Motion Vectors for Highly Scalable Video Coding", PROC. 24th Picture Coding Symposium 2004 (PCS 2004) (Dec. 2004).

\* cited by examiner

METHOD AND APPARATUS FOR SLICE ADAPTIVE MOTION VECTOR CODING FOR SPATIAL SCALABLE VIDEO ENCODING AND DECODING

CROSS-REFERENCE TO RELATED APPLICATIONS

This application claims the benefit, under 35 U.S.C. §365 of International Application PCT/US2006/09915, filed Mar. 20, 2006, which was published in accordance with PCT Article 21(2) on Oct. 26, 2006 in English and which claims the benefit of U.S. provisional patent application No. 60/671,257 filed Apr. 14, 2005.

FIELD OF THE INVENTION

The present invention relates generally to video encoders and decoders and, more particularly, to methods and apparatus for slice adaptive motion vector coding for spatial scalable video encoding and decoding.

BACKGROUND OF THE INVENTION

It is desirable that a scalable video coding scheme can support different applications and decoder requirements without incurring the bitrate penalty of simulcast encoding. For many existing scalable coding schemes, where motion estimation and compensation is applied to remove the temporal redundancy, the prior art approaches used to code motion vectors have deficiencies. In general, two methods have been used to code the motion vectors: non-scalable motion vector coding and scalable motion vector coding. In the non-scalable motion vector coding scheme, the motion vector is coded with the precision of the highest enhancement layer and is stored in the base layer. Then, for the lower layer, the motion vectors need to be downsampled. In the scalable motion vector coding scheme, a refinement of a lower layer motion vector is coded at each higher layer such that the coded motion vector represents the motion vector precision for that higher layer. For total bitrate coding efficiency, non-scalable motion vector coding has better efficiency than scalable motion vector coding. However, non-scalable motion vector coding puts all the bits for motion vectors in the base layer. Thus, if bitrate scalability is required, non-scalable motion vector coding can hurt base layer quality. Since non-scalable motion vector coding requires downsampling for lower layers, it can cause the problem of the base layer not being standard compliant. Some of the decoders may not be able to support such a feature. On the other hand, if bitrate scalability is not a requirement, but instead complexity and total bitrate coding efficiency, such as in broadcast video applications, non-scalable motion vector coding can have better coding efficiency.

Many different methods of scalability have been widely studied and standardized, including SNR scalability, spatial scalability, temporal scalability, and fine grain scalability, in scalability profiles of the MPEG-2 and MPEG-4 standards. Most of the work in scalable coding has been aimed at bitrate scalability, where the low resolution layer has a limited bandwidth. As shown in FIG. 1, a typical spatial scalability system is indicated generally by the reference numeral 100. The system 100 includes a complexity scalable video encoder 110 for receiving a video sequence. A first output of the complexity scalable video encoder 110 is connected in signal communication with a low bandwidth network 120 and with a first input of a multiplexer 130. A second output of the complexity scalable video encoder 110 is connected in signal communication with a second input of the multiplexer 130. An output of the low bandwidth network 120 is connected in signal communication with an input of a low resolution decoder 140. An output of the multiplexer 130 is connected in signal communication with an input of a high bandwidth network 150. An output of the high bandwidth network 150 is connected in signal communication with an input of a demultiplexer 160. A first output of the demultiplexer 160 is connected in signal communication with a first input of a high resolution decoder 170, and a second output of the demultiplexer 160 is connected in signal communication with a second input of the high resolution decoder 170. An output of the low-resolution decoder 140 is available as an output of the system 100 for a base layer bitstream, and an output of the high-resolution decoder 170 is available as an output of the system 100 for a scalable bitstream.

Scalable coding has not been widely adopted in practice, because of the considerable increase in encoder and decoder complexity, and because the coding efficiency of scalable encoders is typically well below that of non-scalable encoders.

Spatially scalable encoders and decoders typically require that the high resolution scalable encoder/decoder provide additional functionality than would be present in a normal high resolution encoder/decoder. In an MPEG-2 spatial scalable encoder, a decision is made whether prediction is performed from a low resolution reference picture or from a high resolution reference picture. An MPEG-2 spatial scalable decoder must be capable of predicting either from the low resolution reference picture or the high resolution reference picture. Two sets of reference picture stores are required by an MPEG-2 spatial scalable encoder/decoder, one for low resolution pictures and another for high resolution pictures. FIG. 2 shows a block diagram for a low-complexity spatial scalable encoder 200 supporting two layers, according to the prior art. FIG. 3 shows a block diagram for a low-complexity spatial scalable decoder 300 supporting two layers, according to the prior art.

Turning to FIG. 2, a spatial scalable video encoder supporting two layers is indicated generally by the reference numeral 200. The video encoder 200 includes a downsampler 210 for receiving a high-resolution input video sequence. The downsampler 210 is coupled in signal communication with a low-resolution non-scalable encoder 212, which, in turn, is coupled in signal communication with low-resolution frame stores 214. The low-resolution non-scalable encoder 212 outputs a low-resolution bitstream, and is further coupled in signal communication with a low-resolution non-scalable decoder 220.

The low-resolution non-scalable decoder 220 is coupled in signal communication with an upsampler 230, which, in turn, is coupled in signal communication with a scalable high-resolution encoder 240. The scalable high-resolution encoder 240 also receives the high-resolution input video sequence, is coupled in signal communication with high-resolution frame stores 250, and outputs a high-resolution scalable bitstream. An output of the low-resolution non-scalable encoder 212 and an output of the scalable high-resolution encoder are available as outputs of the spatial scalable video encoder 200.

Thus, a high resolution input video sequence is received by the low-complexity encoder 200 and down-sampled to create a low-resolution video sequence. The low-resolution video sequence is encoded using a non-scalable low-resolution video compression encoder, creating a low-resolution bitstream. The low-resolution bitstream is decoded using a non-scalable low-resolution video compression decoder. This function may be performed inside of the encoder. The decoded low-resolution sequence is up-sampled, and provided as one of two inputs to a scalable high-resolution encoder. The scalable high-resolution encoder encodes the video to create a high-resolution scalable bitstream.

Turning to FIG. 3, a spatial scalable video decoder supporting two layers is indicated generally by the reference numeral 300. The video decoder 300 includes a low-resolution decoder 360 for receiving a low-resolution bitstream, which is coupled in signal communication with low-resolution frame stores 362, and outputs a low-resolution video sequence. The low-resolution decoder 360 is further coupled in signal communication with an upsampler 370, which, in turn, is coupled in signal communication with a scalable high-resolution decoder 380.

The scalable high-resolution decoder 380 is further coupled in signal communication with high-resolution frame stores 390. The scalable high-resolution decoder 380 receives a high-resolution scalable bitstream and outputs a high-resolution video sequence. An output of the low-resolution decoder 360 and an output of the scalable high-resolution decoder are available as outputs of the spatial scalable video decoder 300.

Thus, both a high-resolution scalable bitstream and low-resolution bitstream are received by the low-complexity decoder 300. The low-resolution bitstream is decoded using a non-scalable low-resolution video compression decoder, which utilizes low-resolution frame stores. The decoded low-resolution video is up-sampled, and then input into a high-resolution scalable decoder. The high-resolution scalable decoder utilizes a set of high-resolution frame stores, and creates the high-resolution output video sequence.

Turning to FIG. 4, a non-scalable video encoder is indicated generally by the reference numeral 400. An input to the video encoder 400 is connected in signal communication with a non-inverting input of a summing junction 410. The output of the summing junction 410 is connected in signal communication with a transformer/quantizer 420. The output of the transformer/quantizer 420 is connected in signal communication with an entropy coder 440. An output of the entropy coder 440 is available as an output of the encoder 400.

The output of the transformer/quantizer 420 is further connected in signal communication with an inverse transformer/quantizer 450. An output of the inverse transformer/quantizer 450 is connected in signal communication with an input of a deblock filter 460. An output of the deblock filter 460 is connected in signal communication with reference picture stores 470. A first output of the reference picture stores 470 is connected in signal communication with a first input of a motion estimator 480. The input to the encoder 400 is further connected in signal communication with a second input of the motion estimator 480. The output of the motion estimator 480 is connected in signal communication with a first input of a motion compensator 490. A second output of the reference picture stores 470 is connected in signal communication with a second input of the motion compensator 490. The output of the motion compensator 490 is connected in signal communication with an inverting input of the summing junction 410.

Turning to FIG. 5, a non-scalable video decoder is indicated generally by the reference numeral 500. The video decoder 500 includes an entropy decoder 510 for receiving a video sequence. A first output of the entropy decoder 510 is connected in signal communication with an input of an inverse quantizer/transformer 520. An output of the inverse quantizer/transformer 520 is connected in signal communication with a first input of a summing junction 540.

The output of the summing junction 540 is connected in signal communication with a deblock filter 590. An output of the deblock filter 590 is connected in signal communication with reference picture stores 550. The reference picture stores 550 is connected in signal communication with a first input of a motion compensator 560. An output of the motion compensator 560 is connected in signal communication with a second input of the summing junction 540. A second output of the entropy decoder 510 is connected in signal communication with a second input of the motion compensator 560. The output of the deblock filter 590 is available as an output of the video decoder 500.

It has been proposed that H.264/MPEG AVC be extended to use a Reduced Resolution Update (RRU) mode. The RRU mode improves coding efficiency at low bitrates by reducing the number of residual macroblocks (MBs) to be coded, while performing motion estimation and compensation of full resolution pictures. Turning to FIG. 6, a Reduced Resolution Update (RRU) video encoder is indicated generally by the reference numeral 600. An input to the video encoder 600 is connected in signal communication with a non-inverting input of a summing junction 610. The output of the summing junction 610 is connected in signal communication with an input of a downsampler 612. An input of a transformer/quantizer 620 is connected in signal communication with an output of the downsampler 612 or with the output of the summing junction 610. An output of the transformer/quantizer 620 is connected in signal communication with an entropy coder 640. An output of the entropy coder 640 is available as an output of the video encoder 600.

The output of the transformer/quantizer 620 is further connected in signal communication with an input of an inverse transformer/quantizer 650. An output of the inverse transformer/quantizer 650 is connected in signal communication with an input of an upsampler 655. An input of a deblock filter 660 is connected in signal communication with an output of the inverse transformer/quantizer 650 or with an output of the upsampler 655. An output of the deblock filter 660 is connected in signal communication with an input of reference picture stores 670. A first output of the reference picture stores 670 is connected in signal communication with a first input of a motion estimator 680. The input to the encoder 600 is further connected in signal communication with a second input of the motion estimator 680. The output of the motion estimator 680 is connected in signal communication with a first input of a motion compensator 690. A second output of the reference picture stores 670 is connected in signal communication with a second input of the motion compensator 690. The output of the motion compensator 690 is connected in signal communication with an inverting input of the summing junction 610.

Turning to FIG. 7, a Reduced Resolution Update (RRU) video decoder is indicated generally by the reference numeral 700. The video decoder 700 includes an entropy decoder 710 for receiving a video sequence. An output of the entropy decoder 710 is connected in signal communication with an input of an inverse quantizer/transformer 720. An output of the inverse quantizer/transformer 720 is connected in signal communication with an input of an upsampler 722. An output of the upsampler 722 is connected in signal communication with a first input of a summing junction 740.

An output of the summing junction 740 is connected in signal communication with a deblock filter 790. An output of the deblock filter 790 is connected in signal communication with an input of full resolution reference picture stores 750. The output of the deblock filter 790 is also available as an output of the video decoder 700. An output of the full resolution reference picture stores 750 is connected in signal communication with a motion compensator 760, which is connected in signal communication with a second input of the summing junction 740.

It has been proposed to use RRU concept to design a complexity scalable codec. An example is provided for a system that supports two different levels of decoder complexity and resolution. A low resolution decoder has a smaller display size and has very strict decoder complexity constraints. A full resolution decoder has a larger display size and less strict but still important decoder complexity constraints. A broadcast or multicast system transmits two bitstreams, a base layer with bitrate $BR_{base}$ and an enhancement layer with bitrate $BR_{enhan}$. The two bitstreams may be multiplexed together and sent in a single transport stream. Turning to FIG. 8, a complexity scalability broadcast system is indicated generally by the reference numeral 800. The system 800 includes a complexity scalable video encoder and a low resolution decoder and a full resolution decoder. The complexity scalability broadcast system 800 includes a complexity scalable video encoder 810. A first output of the complexity scalable video encoder 810 is connected in signal communication with a first input of a multiplexer 820. A second output of the complexity scalable video encoder 810 is connected in signal communication with a second input of the multiplexer 820. An output of the multiplexer 820 is connected in signal communication with a network 830. An output of the network 830 is connected in signal communication with an input of a first demultiplexer 840 and with an input of a second demultiplexer 850. An output of the first demultiplexer 840 is connected in signal communication with an input of a low resolution decoder 850. A first output of the second demultiplexer 860 is connected in signal communication with a first input of a full resolution decoder 870. A second output of the second demultiplexer 860 is connected in signal communication with a second input of the full resolution decoder 870. An output of the low-resolution decoder 850 is available as an output of the system 800 for a base layer bitstream, and an output of the full-resolution decoder 870 is available as an output of the system 800 for a scalable bitstream.

The low-resolution decoder 850 processes only the base layer bitstream and the full resolution decoder 870 processes both the base layer bitstream and the enhancement layer bitstream. RRU is used in the base layer, which can be decoded into both low resolution and high resolution sequences with different complexity at the decoder. The enhancement layer bitstream includes a full resolution error signal, to be added to the result of decoding the base layer bitstream, which was done with full resolution motion compensation. The bitrate of the enhancement layer may end up being lower than that of the base layer, which differs from the typical spatial scalability case where the base layer bitrate is typically small compared with the enhancement layer bitrate. A full resolution error signal is not necessarily sent for every coded macroblock or slice/picture.

SUMMARY OF THE INVENTION

These and other drawbacks and disadvantages of the prior art are addressed by the present invention, which is directed to methods and apparatus for slice adaptive motion vector coding for spatial scalable video encoding and decoding.

According to an aspect of the present invention, there is provided a method for spatial scalable video encoding. The method includes selecting between scalable coding and non-scalable coding of motion vectors on a slice basis.

According to another aspect of the present invention, there is provided a spatial scalable video encoder. The spatial scalable video encoder includes an encoder for performing a selection between scalable coding and non-scalable coding of motion vectors on a slice basis.

According to yet another aspect of the present invention, there is provided a method for spatial scalable video decoding of a bitstream. The method includes determining whether to use a motion vector coded in the bitstream or to use a quotient of the motion vector divided by a scaling factor, based on a syntax field in a header of the bitstream.

According to still another aspect of the present invention, there is provided a spatial scalable video decoder for decoding a bitstream. The spatial scalable video decoder includes a decoder for determining whether to use a motion vector coded in the bitstream or to use a quotient of the motion vector divided by a scaling factor, based on a syntax field in a header of the bitstream.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
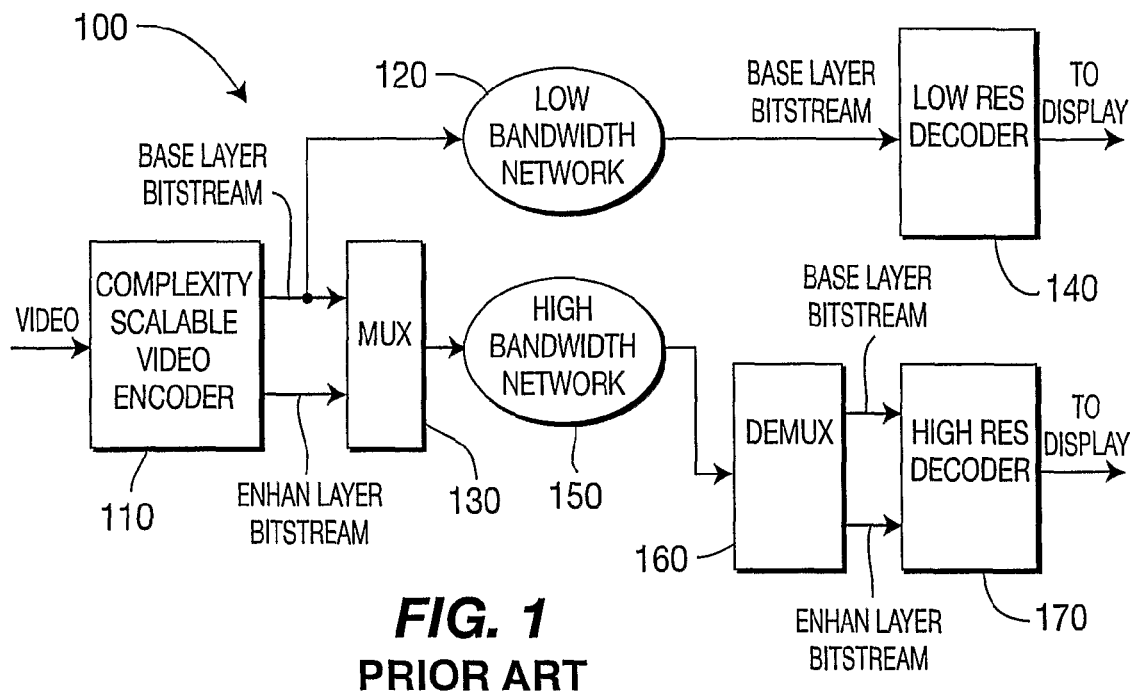
FIG. 1 shows a block diagram for a typical spatial scalability system, according to the prior art.
Figure 2:
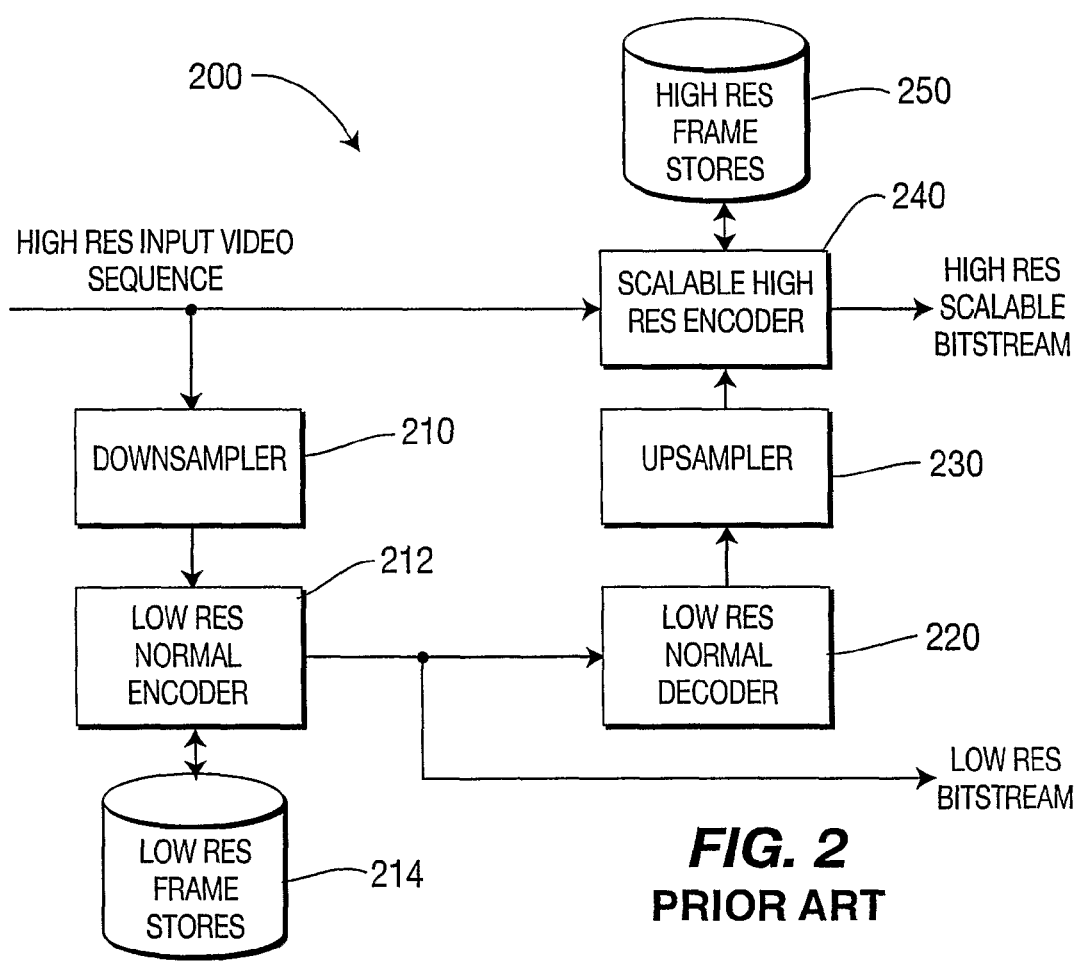
FIG. 2 shows a block diagram for a spatial scalable encoder supporting two layers, according to the prior art.
Figure 3:
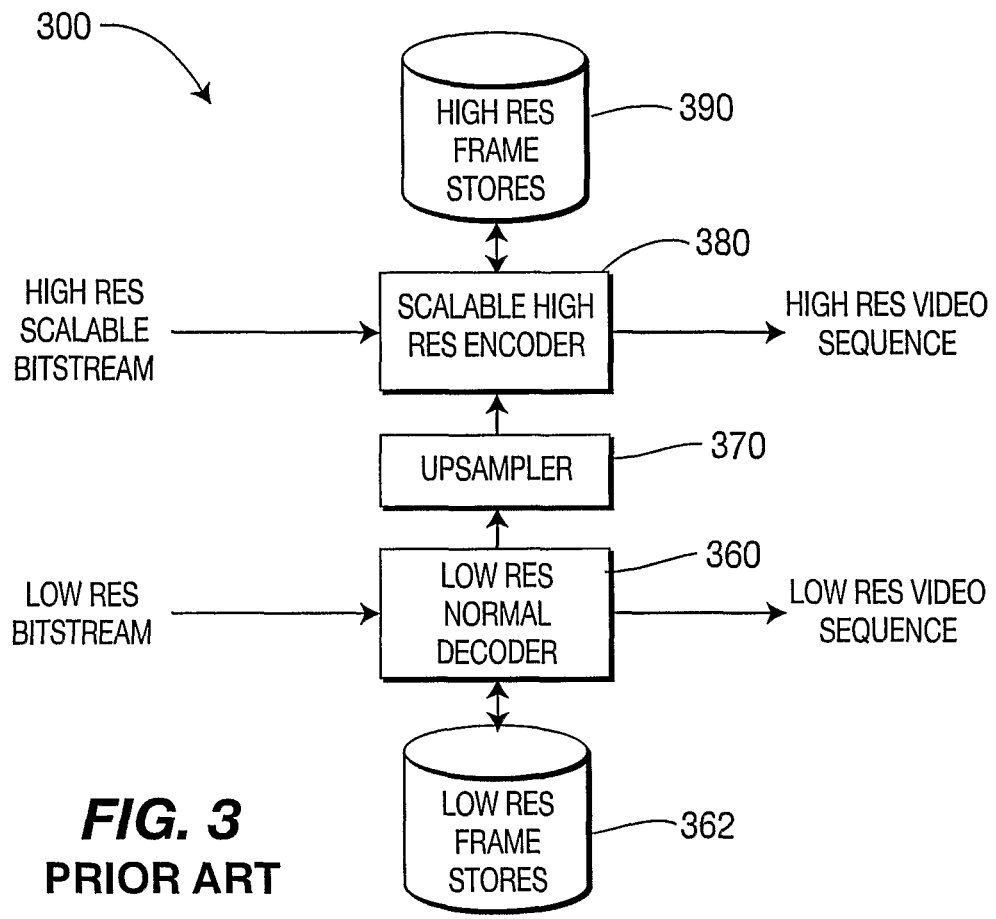
FIG. 3 shows a block diagram for a spatial scalable decoder supporting two layers, according to the prior art.
Figure 4:
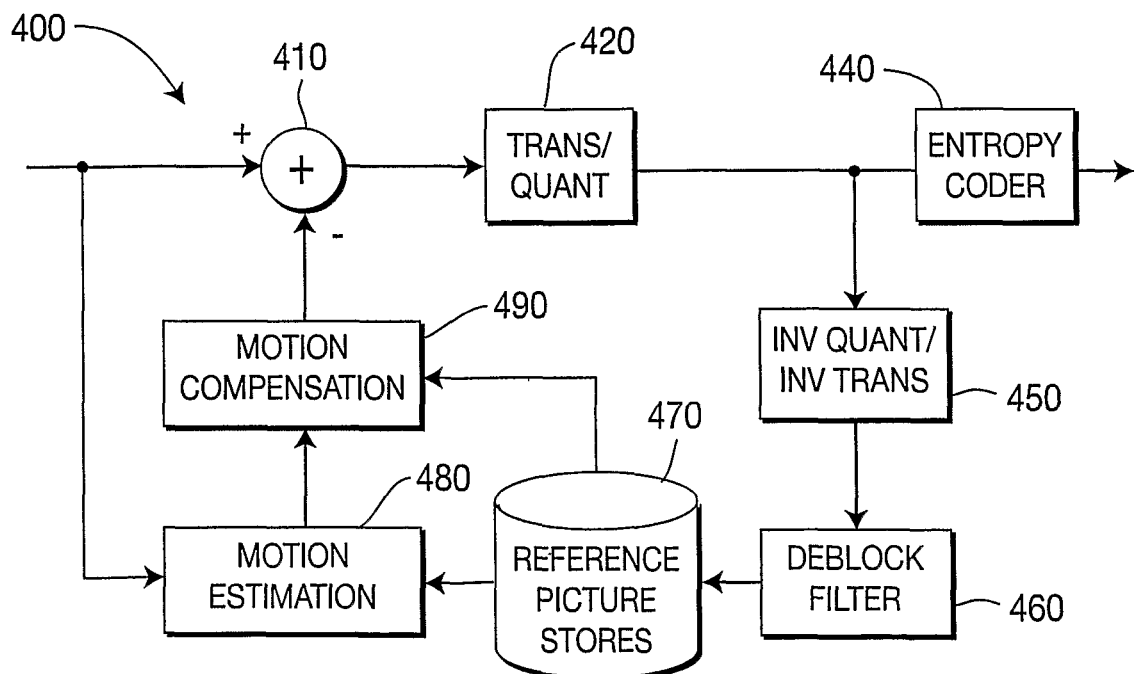
FIG. 4 shows a block diagram for a normal non-scalable video encoder used in the H.264/MPEG AVC standard, according to the prior art.
Figure 5:
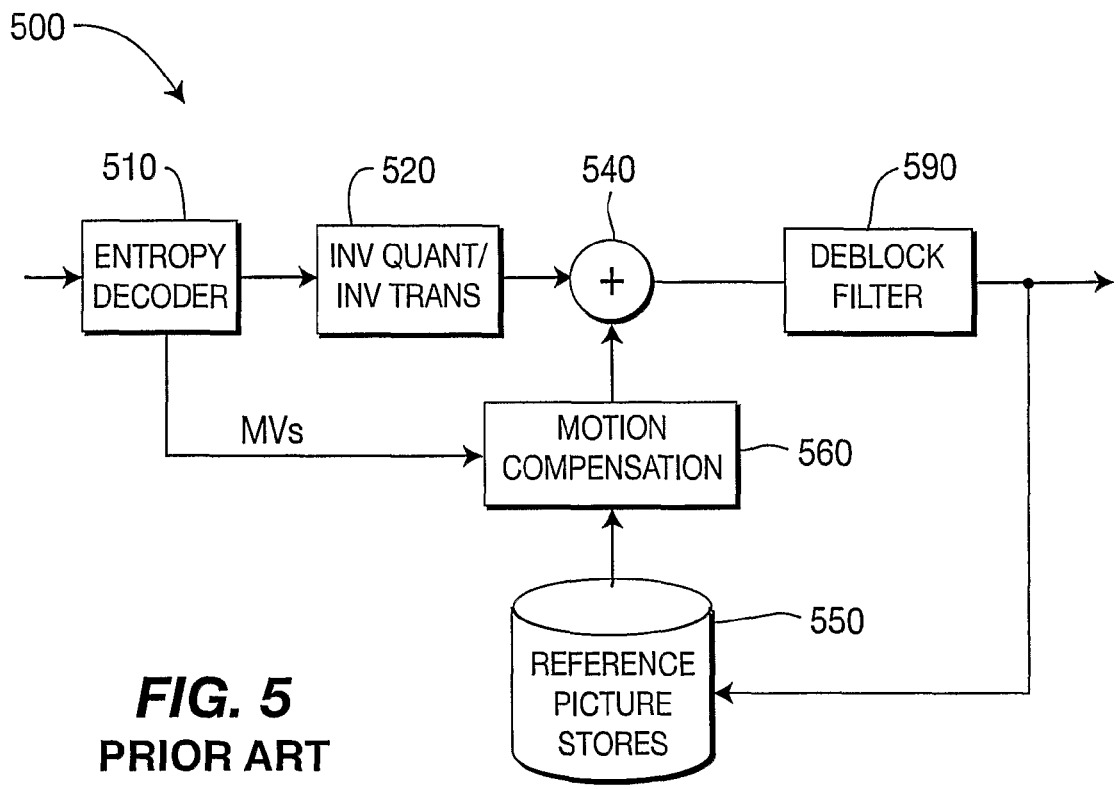
FIG. 5 shows a block diagram for a normal non-scalable video decoder used with H.264/MPEG AVC, according to the prior art.
Figure 7:
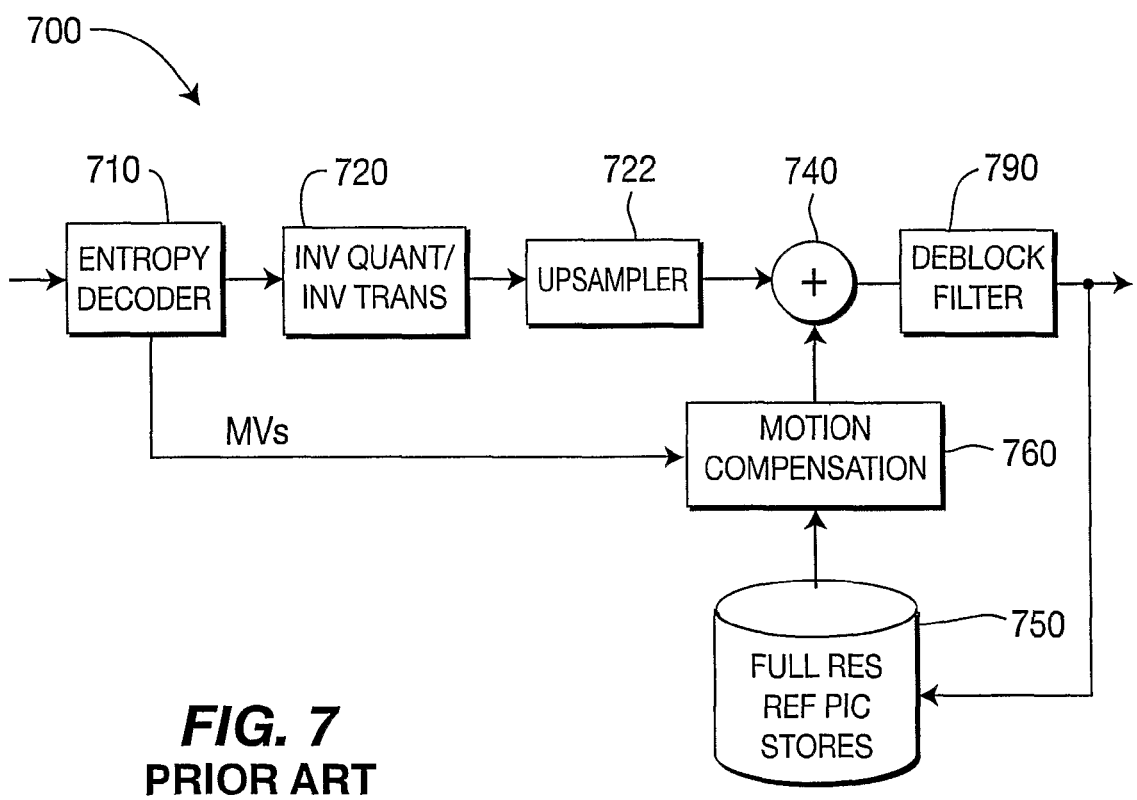
FIG. 7 shows a block diagram for a Reduced Resolution Update (RRU) video decoder, according to the prior art.
Figure 6:
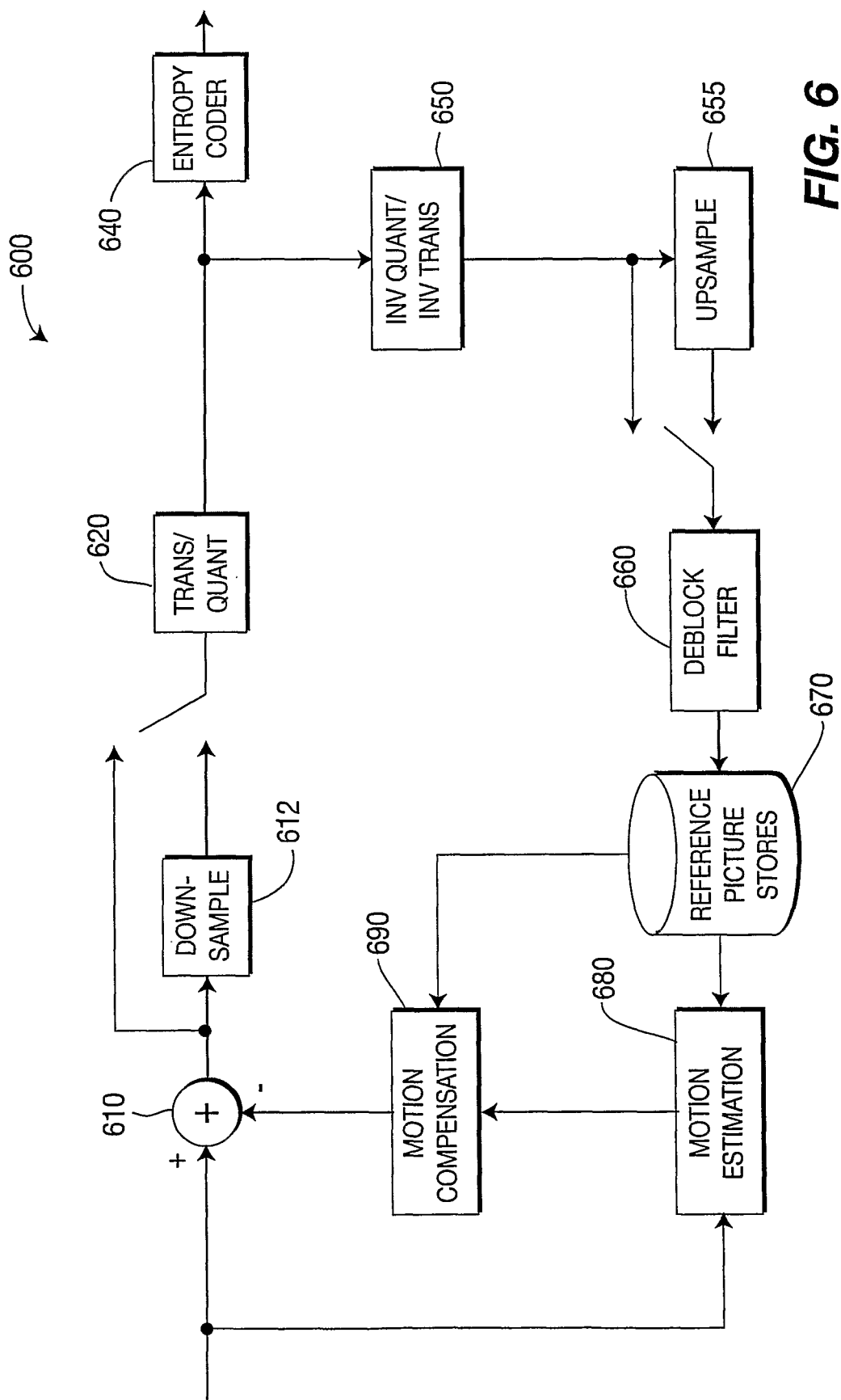
FIG. 6 shows a block diagram for a Reduced Resolution Update (RRU) video encoder, according to the prior art.
Figure 8:
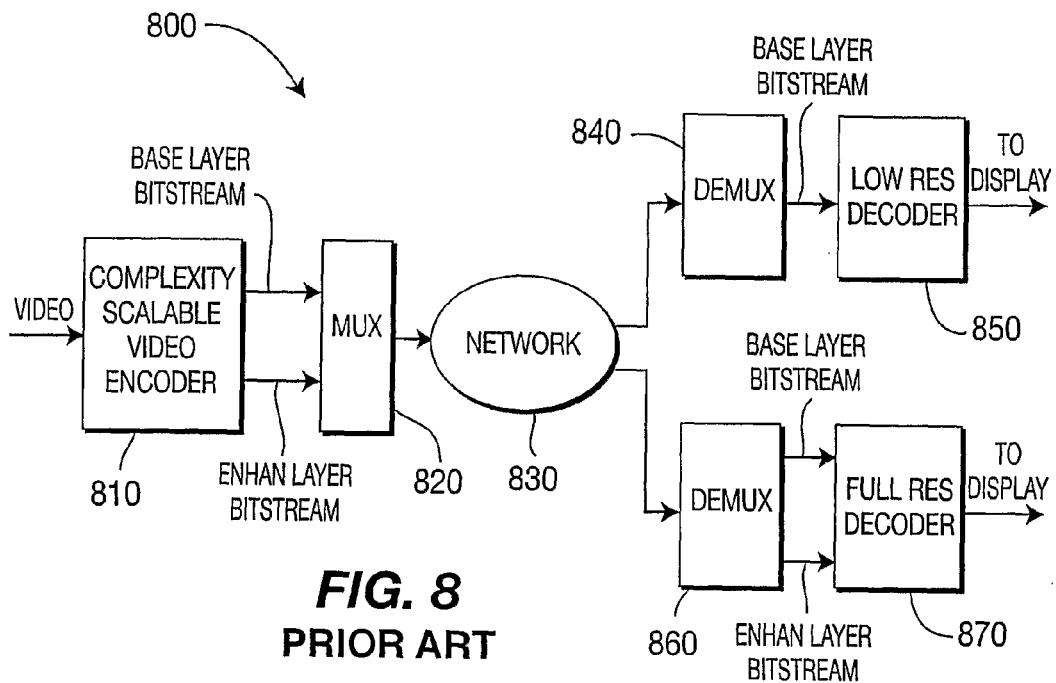
FIG. 8 shows a block diagram for a complexity scalability broadcast system, according to the prior art.

The present invention is directed to methods and apparatus for slice adaptive motion vector coding for spatial scalable video encoding and decoding. That is, a slice adaptive selection is performed between scalable coding and non-scalable coding of motion vectors. It is to be appreciated that "scalable coding of a motion vector" as used herein refers to a scalable motion vector scheme wherein a refinement of a lower layer motion vector is coded at each higher layer such that the coded motion vector represents the motion vector precision for that higher layer.

It is to be appreciated that the slice adaptive selection may be based on considerations including, but not limited to, base layer compatibility, bitrate scalability, total bitrate coding efficiency and complexity. Given the teachings of the present principles provided herein, these and other considerations may also be implemented in accordance with the present principles, while maintaining the scope of the present principles.

In most scalable video coding schemes where motion estimation and compensation is applied to remove the temporal redundancy, the approach to be taken for motion vector coding should be given due consideration. In accordance with the present principles, methods and apparatus are provided that allow for slice adaptive selection between non-scalable motion vector coding and scalable motion vector coding for a spatial scalable video encoder and/or decoder. The methods and apparatus discloses herein can provide a better tradeoff of total bitrate coding efficiency, bitrate or complexity scalability and decoder requirements.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

As noted above, the present principles are directed to methods and apparatus that support a slice adaptive decision on motion vector (MV) coding for spatial scalable video encoding and/or decoding. It is to be appreciated that for illustrative purposes, the methods and apparatus in accordance with the present principles are described herein with respect to the International Telecommunication Union, Telecommunication Sector (ITU-T) H.264 standard (hereinafter the "H.264 standard"). However, it is to be appreciated that implementations in accordance with the present principles are not limited to solely the H.264 standard and, thus, other video encoding and decoding standards may also be employed in accordance with the present principles. That is, given the teachings of the present principles provided herein, one of ordinary skill in this and related arts will contemplate applications of the present principles relating to the H.264 standard as well as other video encoding and decoding standards, while maintaining the scope of the present principles.

Figure 9:
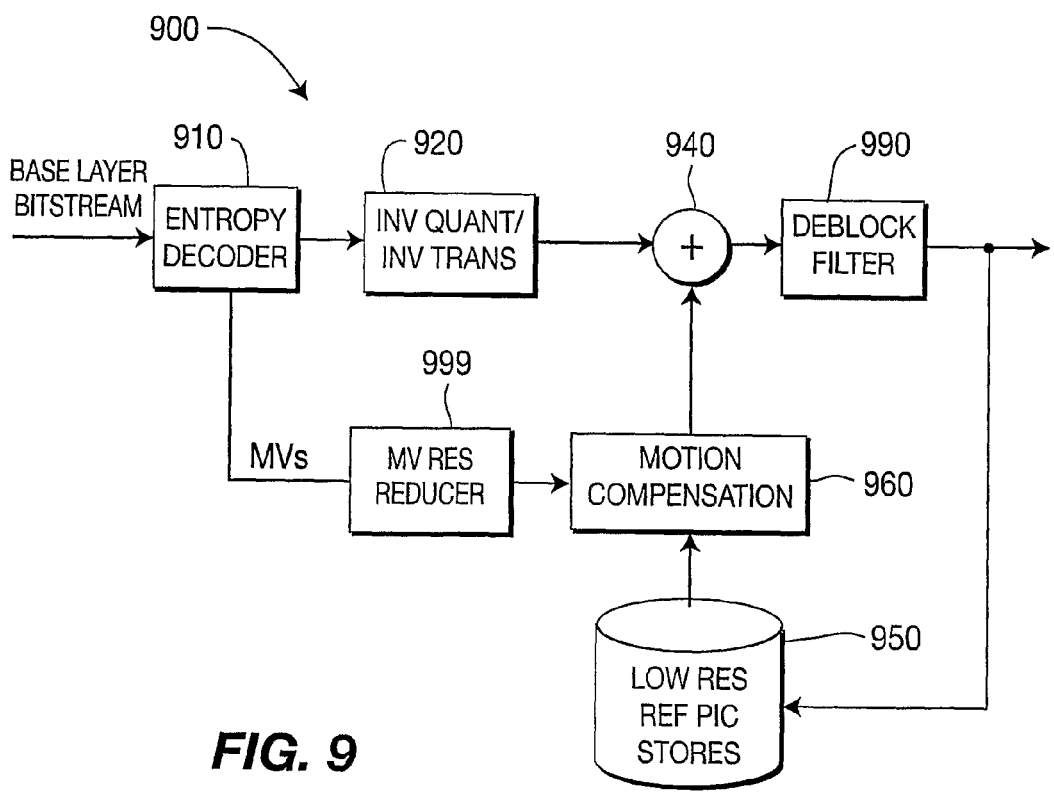
FIG. 9 shows a block diagram for an exemplary low resolution complexity scalable video decoder to which the present principles may be applied, in accordance with an embodiment thereof.

Turning to FIG. 9, a low resolution complexity scalable video decoder is indicated generally by the reference numeral 900. The video decoder 900 includes an entropy decoder 910 for receiving a video sequence. A first output of the entropy decoder 910 is connected in signal communication with an input of an inverse quantizer/transformer 920. An output of the inverse quantizer/transformer 920 is connected in signal communication with a first input of a summing junction 940.

The output of the summing junction 940 is connected in signal communication with a deblock filter 990. An output of the deblock filter is connected in signal communication with an input of reference picture stores 950. The output of the deblock filter 990 is also available as an output of the video decoder 900. An output of the reference picture stores 950 is connected in signal communication with a first input of a motion compensator 960. An output of the motion compensator 960 is connected in signal communication with a second input of the summing junction 940. A second output of the entropy decoder 910 is connected in signal communication with an input of a motion vector (MV) resolution reducer 999. An output of the MV resolution reducer 999 is connected in signal communication with a second input of the motion compensator 960.

In the decoder 900, the base layer bitstream is entropy decoded. The motion vectors are scaled and rounded to reduce them in accuracy to correspond to the low resolution. The complexity of this low resolution scalable decoder is very similar to that of a non-scalable decoder, as scaling of motion vectors is of very low complexity. If factors of 2 are used in the resolution ratios in each dimension between the low and full resolution, then the rounding can be implemented with just a right shift or an add and a right shift, depending whether rounding up or rounding down is selected in the system.

Figure 10:
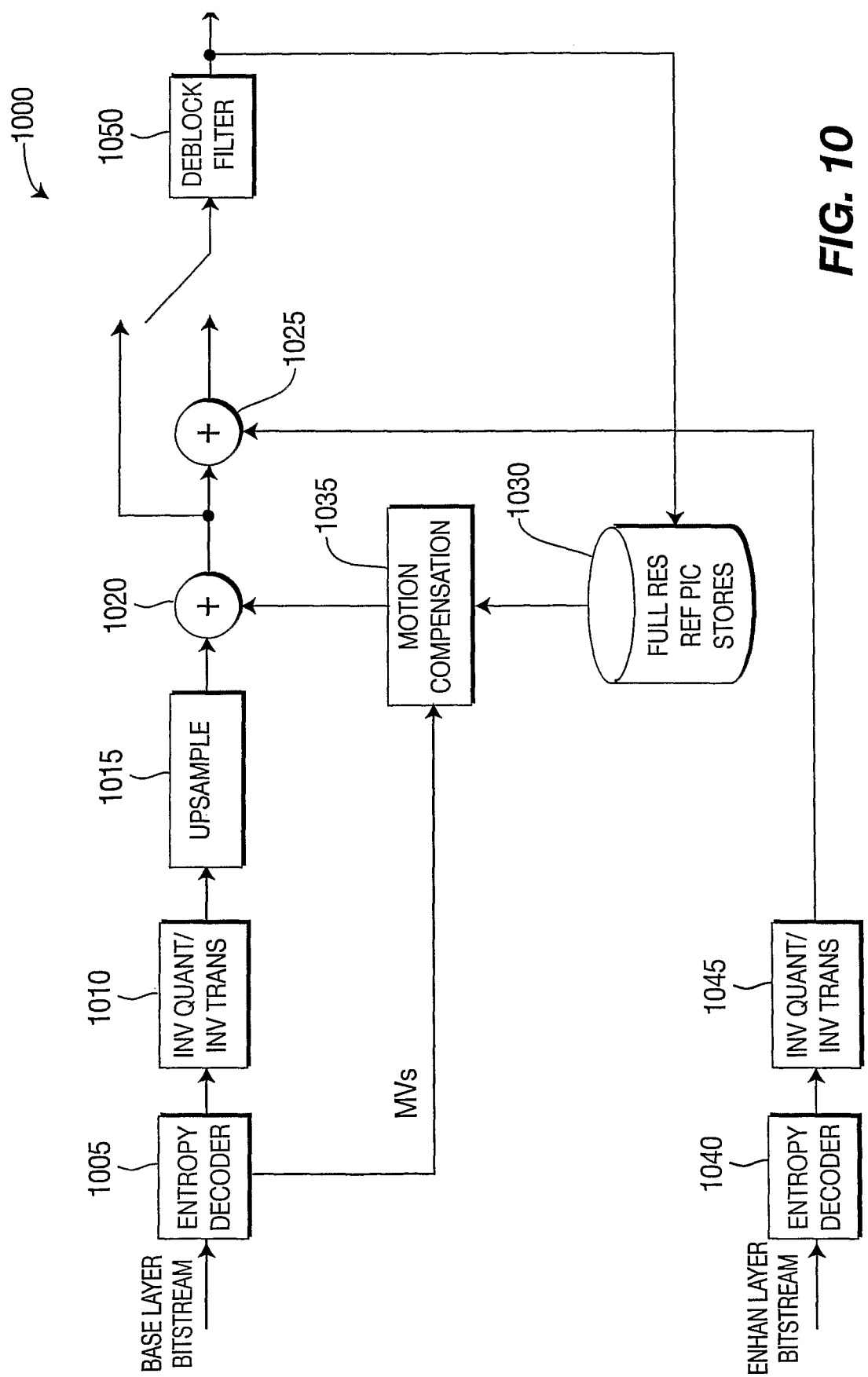
FIG. 10 shows a block diagram for an exemplary high resolution complexity scalable video decoder to which the present principles may be applied, in accordance with an embodiment thereof.

Turning to FIG. 10, a high resolution complexity scalable video decoder 1000 is indicated generally by the reference numeral 1000. The video decoder 1000 includes a first entropy decoder 1005 for receiving a base layer bitstream. An output of the first entropy decoder 1005 is connected in signal communication with an input of a first inverse quantizer/transformer 1010. An output of the first inverse quantizer/transformer 1010 is connected in signal communication with an input of an upsampler 1015. An output of the upsampler 1015 is connected in signal communication with a first input of a first summing junction 1020.

An output of the first summing junction 1020 is connected in signal communication with a first input of a second summing junction 1025. An output of a full resolution reference picture stores 1030 is connected in signal communication with a first input of a motion compensator 1035. A second output of the entropy decoder (for outputting motion vectors (MVs)) 1005 is connected in signal communication with a second input of the motion compensator 1035. An output of the motion compensator 1035 is connected in signal communication with a second input of the first summing junction 1020.

An input of a second entropy decoder 1040 is for receiving an enhanced layer bitstream. An output of the second entropy decoder 1040 is connected in signal communication with an input of a second inverse quantizer/transformer 1045. An output of the second inverse quantizer/transformer 1045 is connected in signal communication with a second input of the second summing junction 1025.

An input to a deblock filter 1050 is connected in signal communication with an output of the first summing junction 1020 or with an output of the second summing junction 1025. An output of the deblock filter 1050 is connected in signal communication with an input of full resolution reference picture stores 1030. The output of the deblock filter 1050 is available as an output of the video decoder 1000.

The portion of the decoder 1000 that operates on the base layer bitstream is similar to an RRU decoder. After entropy decoding and inverse quantization and inverse transform, the residual is upsampled. Motion compensation is applied to the full resolution reference pictures to form a full resolution prediction, and the upsampled residual is added to the prediction. If a full resolution error signal is present in the enhancement layer bitstream, it is entropy decoded and inversed quantized and transformed, and then added to the RRU reconstructed signal. The deblocking filter is then applied.

Figure 11:
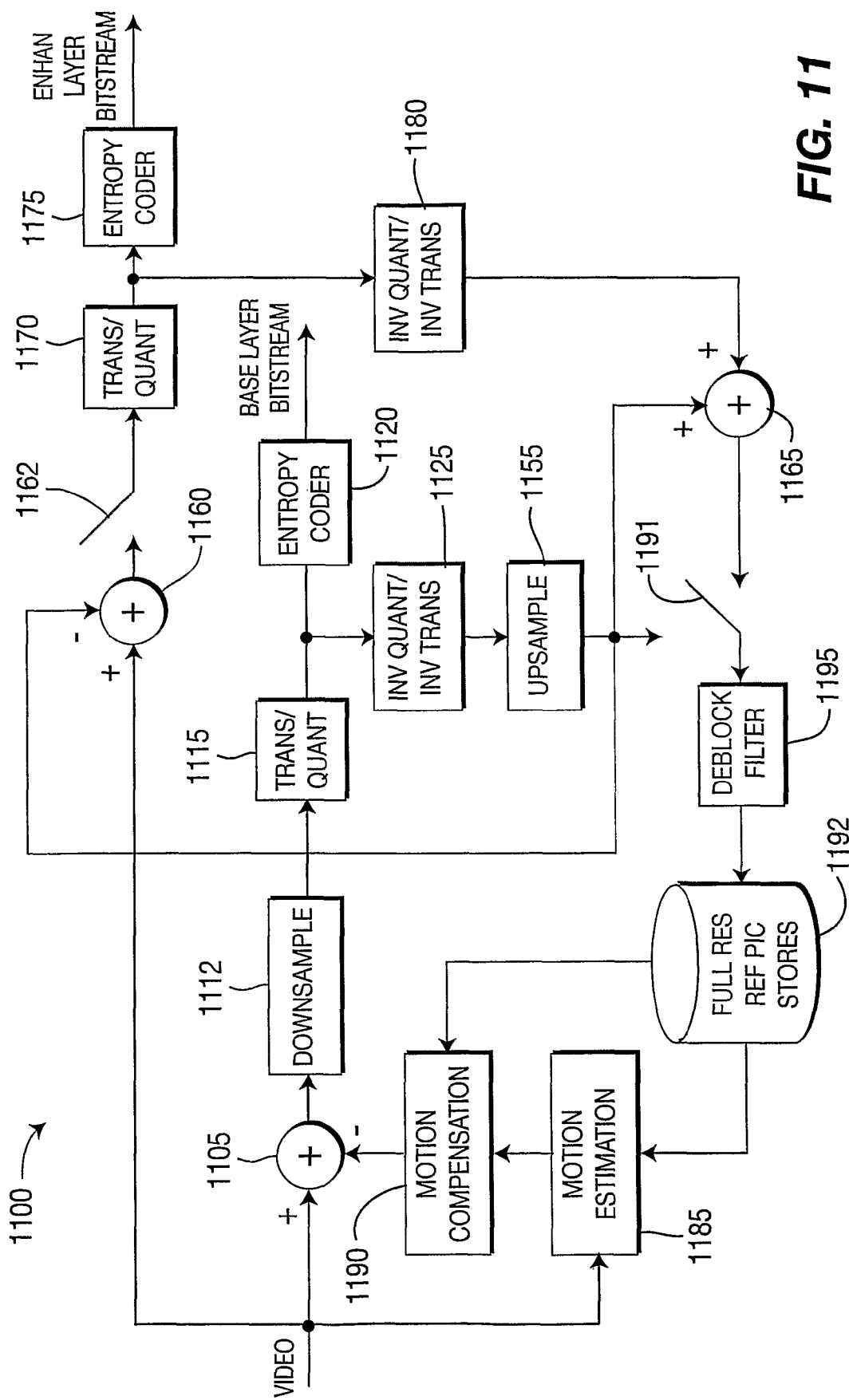
FIG. 11 shows a block diagram for an exemplary complexity scalable video encoder to which the present principles may be applied, in accordance with an embodiment thereof.

Turning to FIG. 11, a complexity scalable video encoder is indicated generally by the reference numeral 1100. An input to the video encoder 1100 is connected in signal communication with a non-inverting input of a first summing junction 1105. The output of the first summing junction 1105 is connected in signal communication with an input of a downsampler 1112. An output of the downsampler 1112 is connected in signal communication with an input of a first transformer/quantizer 1115. An output of the first transformer/quantizer 1115 is connected in signal communication with an input of a first entropy coder 1120. An output of the first entropy coder 1120 is available as an output of the encoder 1100 for a base layer bitstream.

The output of the first transformer/quantizer 1115 is further connected in signal communication with an input of a first inverse transformer/quantizer 1125. An output of the first inverse transformer/quantizer 1125 is connected in signal communication with an input of an upsampler 1155. An output of the upsampler 1155 is connected in signal communication with an inverting input of a second summing junction 1160 and with a first non-inverting input of a third summing junction 1165.

The input to the video encoder 1100 is further connected in signal communication with a non-inverting input of a second summing junction 1160. An output of the second summing junction 1160 is connected in signal communication with an input of a switch 1162. An output of the switch 1162 is connected in signal communication with an input to a second transformer/quantizer 1170. An output of the second transformer/quantizer 1170 is connected in signal communication with an input of a second entropy coder 1175. An output of the second entropy coder 1175 is available as an output of the encoder 1100 for an enhanced layer bitstream. The output of the second transformer/quantizer 1170 is further connected in signal communication with an input of a second inverse transformer/quantizer 1180. An output of the second inverse transformer/quantizer 1180 is connected in signal communication with a second non-inverting input of the third summing junction 1165.

The input to the video encoder 1100 is yet further connected in signal communication with a first input of a motion estimator 1185. An output of the motion estimator 1185 is connected in signal communication with a first input of a motion compensator 1190. An output of the motion compensator 1190 is connected in signal communication with an inverting input of the first summing junction 1105. A first output of a full resolution reference picture stores 1192 is connected in signal communication with a second input of the motion estimator 1185. A second output of the full resolution reference picture stores 1192 is connected in signal communication with a second input of the motion compensator 1190. An input of the full resolution reference picture stores 1192 is connected in signal communication with an output of a deblock filter 1195. An input of the deblock filter 1195 is connected in signal communication with an output of the switch 1191. Another input of the switch 1191 is connected in signal communication with an output of the third summing junction 1165.

The encoder 1100 attempts to optimize the full resolution video quality rather than the low resolution video quality. Motion estimation is performed on the full resolution video picture. After subtracting the motion compensated prediction from the input picture, the prediction residual is downsampled. Unlike in the RRU codec, the downsampling is applied to all pictures, so that the low resolution decoder can always have a picture to decode. The downsampled residual is transformed and quantized, and entropy coded. This forms the base layer bitstream. The inverse quantizer and inverse transform is applied, and then the coded residual is upsampled back to the full resolution. The encoder 1100 can choose whether or not to send an enhancement layer full resolution error signal for the picture or slice. In general, an enhancement layer full resolution error signal is coded for all I slices, and can be optionally sent for P and B slices based on the magnitude of the error signal when the full resolution input picture subtracts the decoded upsampled. If an enhancement layer full resolution error signal is to be coded, the coded base layer upsampled coded picture is subtracted from the input full resolution picture. The difference is then quantized, transformed and entropy coded to form the enhancement layer bitstream. The enhancement layer bitstream can be seen as containing only intra-coded slices. Thus, in this RRU based complexity scalable video coding scheme, motion vectors are non-scalable coded.

Figure 12:
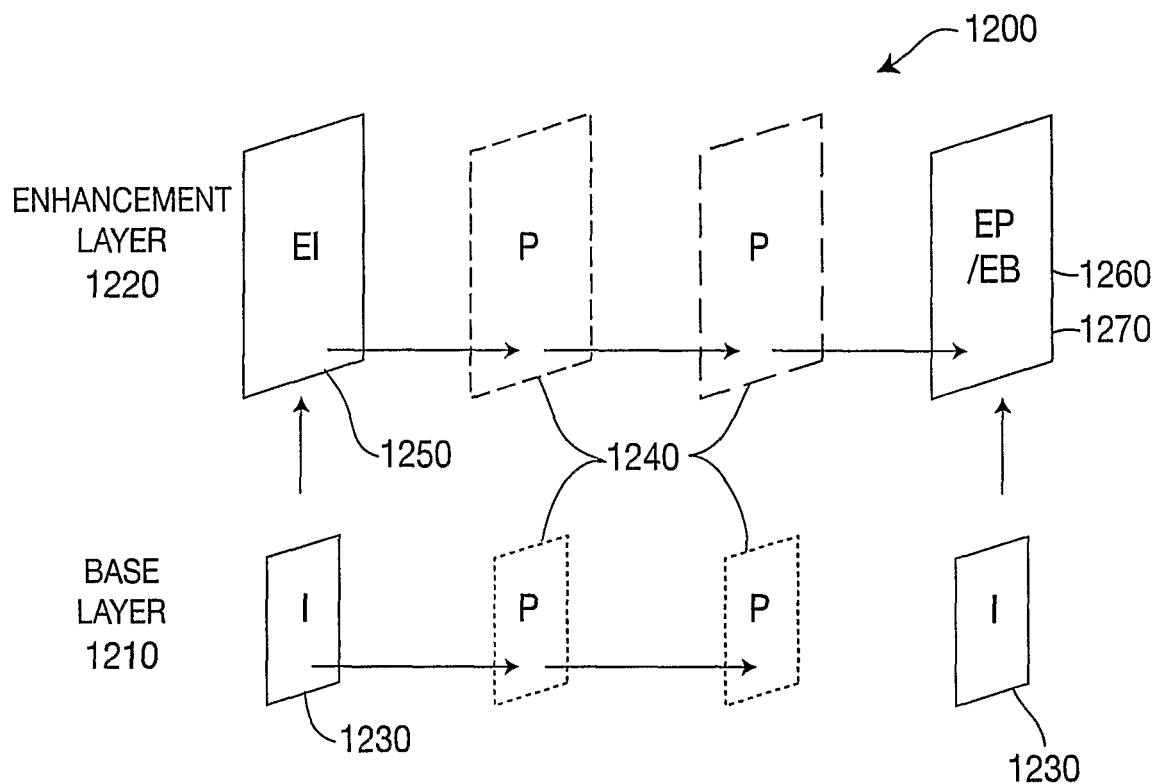
FIG. 12 shows a diagram for complexity scalability in accordance with an exemplary embodiment of the present principles.

Turning to FIG. 12, complexity scalability in accordance with the principles of the present invention is indicated generally by the reference numeral 1200. The complexity scalability 1200 involves a base layer 1210 and an enhancement layer 1220. The picture types involved include I pictures 1230, P pictures 1240, EI pictures 1250, EP pictures 1260, and EB pictures 1270. The P pictures 1240 in both layers are both decoded from the same bitstream but with different decoding techniques.

It is to be appreciated the methods described herein with respect to encoding and/or decoding video signal data in accordance with the present principles, for example, FIGS. 13, 14, 15, 16a, and 16B, are so described herein to illustrate various exemplary aspects of the present principles. However, it is to be further appreciated that some known and/or readily ascertainable steps relating to encoding and/or decoding may be omitted for the sake of clarity and brevity.

Figure 13:
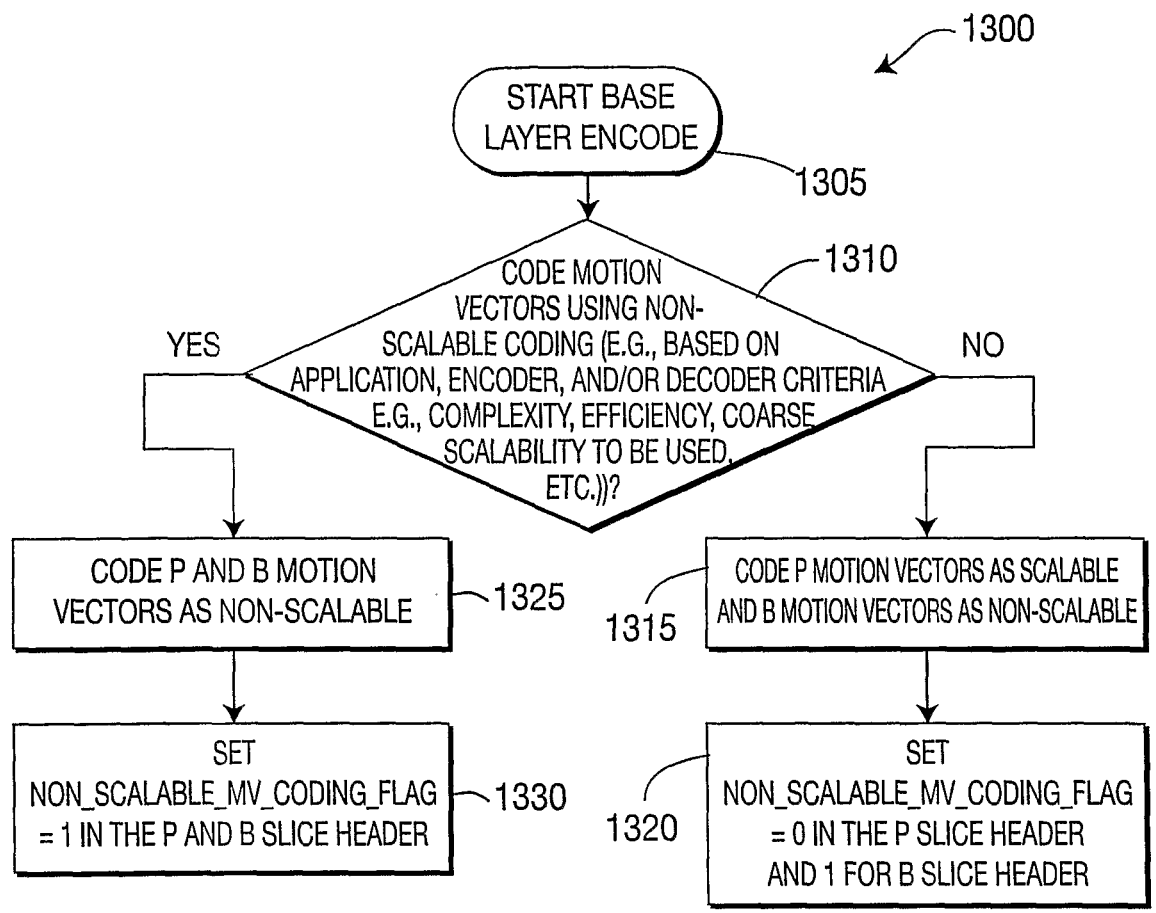
FIG. 13 shows a flow diagram for an exemplary method for adaptive motion vector coding for a spatial scalable video encoder, in accordance with the present principles.

Turning to FIG. 13, an exemplary method for adaptive motion vector encoding for a spatial scalable video encoder is indicated generally by the reference numeral 1300. A start block 1305 starts base layer encoding, and passes control to a decision block 1310. The decision block 1310 determines whether or not to code motion vectors using non-scalable coding (or scalable coding) on a slice basis, based on, e.g., application and/or decoder criteria (e.g., is coarse scalability to be used). If not, then control is passed to a function block 1315. Otherwise, control is passed to a function block 1325.

The function block 1315 codes P motion vectors as scalable and B motion vectors as non-scalable, and passes control to a function block 1320. The function block 1320 sets non_scalable_mv_coding_flag equal to 0 in the P slice header and to 1 in the B slice header.

The function block 1325 codes P and B motion vectors as non-scalable, and passes control to a function block 1330. The function block 1330 sets non_scalable_mv_coding_flag equal to 1 in both P and B slice headers.

Figure 14:
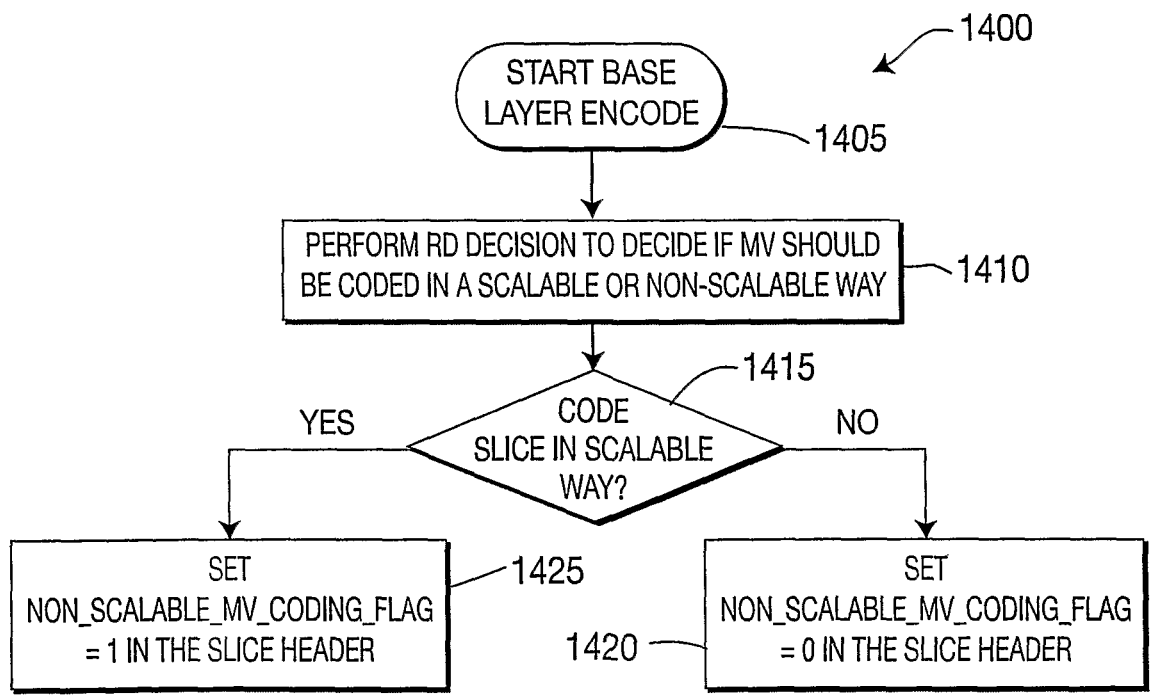
FIG. 14 shows a flow diagram for another exemplary method for adaptive motion vector coding for a spatial scalable video encoder, in accordance with the present principles.

Turning to FIG. 14, another exemplary method for adaptive motion vector encoding for a spatial scalable video encoder is indicated generally by the reference numeral 1400. A start block 1405 starts base layer encoding, and passes control to a function block 1410. The function block 1410 performs a rate distortion (RD) decision to decide whether or not an motion vector (MV) should be scalable coded or non-scalable coded, and passes control to a decision block 1415. The decision block 1415 determines whether or not coarse scalability is to be used. If not, then control is passed to a function block 1420. Otherwise, control is passed to a function block 1425.

The function block 1420 sets non_scalable_mv_coding_flag equal to 0 in the slice header. The function block 1425 sets non_scalable_mv_coding_flag equal to 1 in the slice header.

Figure 15:
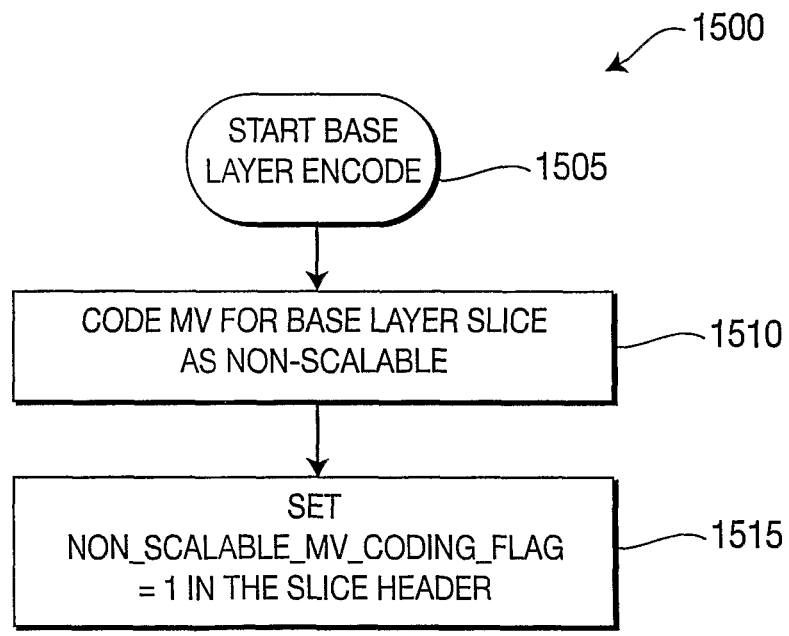
FIG. 15 shows a flow diagram for yet another exemplary method for adaptive motion vector coding for a spatial scalable video encoder, in accordance with the present principles.

Turning to FIG. 15, yet another exemplary method for adaptive motion vector encoding for a spatial scalable video encoder is indicated generally by the reference numeral 1500. A start block 1505 starts base layer encoding, and passes control to a function block 1510. The function block 1510 codes a motion vector for a base layer slice as non-scalable, and passes control to a function block 1515. The function block 1515 sets non_scalable_mv_coding_flag equal to 1 in the slice header.

Figure 16A:
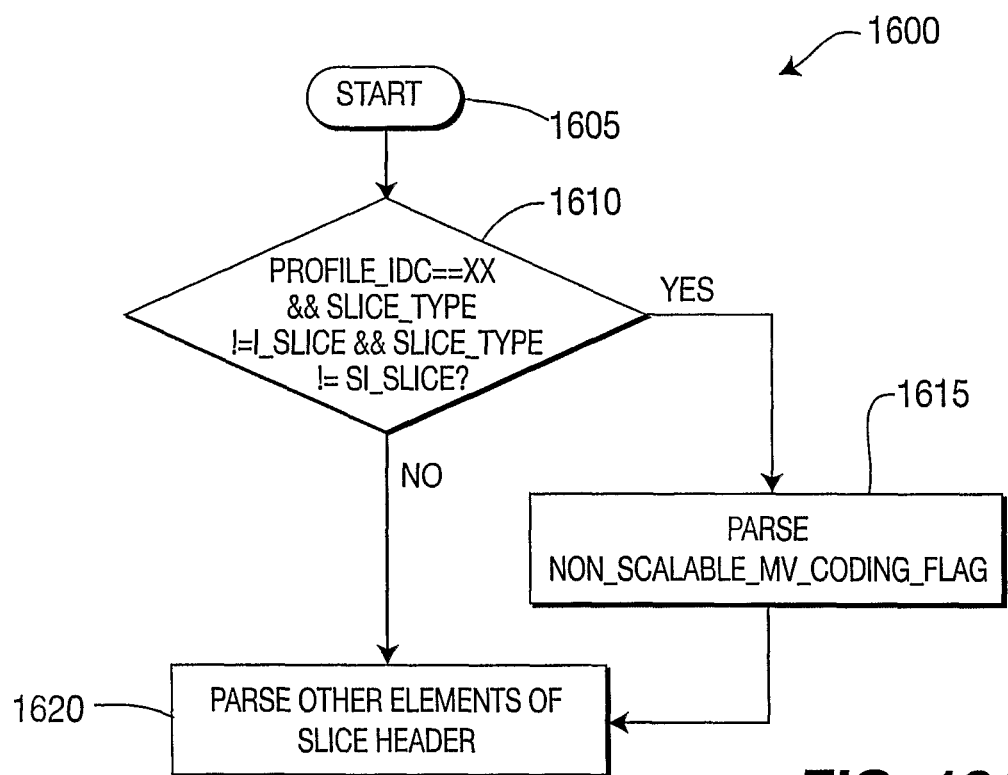
FIG. 16A shows a flow diagram for an exemplary method for parsing a slice header for a spatial scalable video decoder, in accordance with the present principles.

Turning to FIG. 16A, an exemplary method for motion vector decoding for a spatial scalable video decoder is indicated generally by the reference numeral 1600. The method 1600 of FIG. 16A relates to the parsing of a slice header in accordance with the present principles.

A start block 1605 starts base layer decoding, and passes control to a decision block 1610. The decision block 1610 determines whether or not Profile_idc==XX && slice_type !=I_SLICE && slice_type !=SI_SLICE. If so, then control is passed to a function block 1615. Otherwise, control is passed to a function block 1620.

The function block 1615 parses non_scalable_mv_coding_flag, and passes control to the function block 1620. The function block 1620 parses other elements of slice header.

Figure 16B:
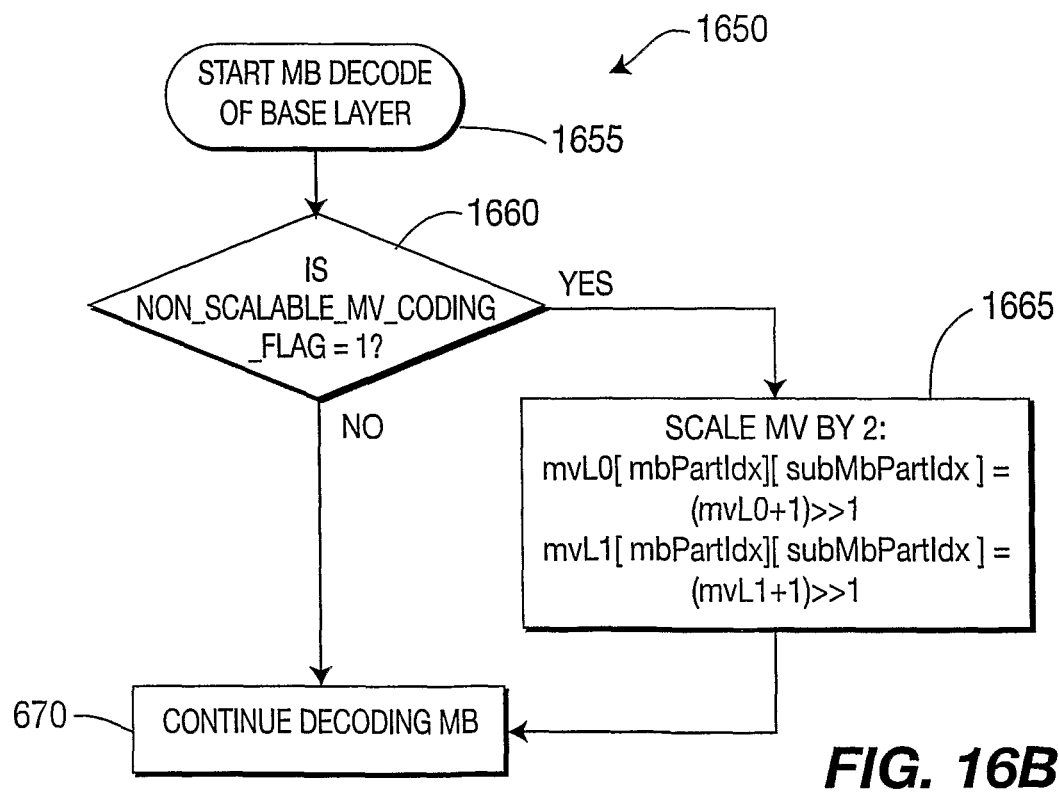
FIG. 16B shows a flow diagram for an exemplary method for motion vector decoding for a spatial scalable video decoder, in accordance with the present principles.

Turning to FIG. 16B, an exemplary method for parsing a slice header for a spatial scalable video decoder is indicated generally by the reference numeral 1650. The method 1650 of FIG. 16B relates to decoding a macroblock motion vector in accordance with the present principles.

A start block 1655 starts base layer decoding, and passes control to a decision block 1660. The decision block 1660 determines whether or not non_scalable_mv_coding_flag is equal to 1. If so, then control is passed to a function block 1665. Otherwise, control is passed to a function block 1670.

The function block 1665 scales the motion vector by 2, such that $$MVL0[mbPartIdx][subMbPartIdx]=(mvL0+1)>>1$$

$$MvL1[mbPartIdx][subMbPartIdx]=(mvL1+1)>>1,$$

and passes control to the function block 1670. The function block 1670 continues decoding the macroblock.

With respect to the existing H.264 standard, one syntax element non_scalable_mv_coding_flag is added as shown in Table 1, which relates to the H.264 slice header. It is presumed that the feature described with respect to Table 1 can be supported in a future profile of, for example, but not limited to, the H.264 standard. In accordance with the present principles, an encoder can decide, e.g., on a slice-by-slice basis, or on a frame-by-frame basis, whether to scalable or non-scalable code the motion vectors based on, e.g., backwards compatibility and coding efficiency requirements. It is to be appreciated that given the teachings of the present invention provided herein, other basis and other requirements may also be employed to perform the adaptive selection between coding the motion vectors using scalable coding or non-scalable coding, while maintaining the scope of the present principles.

TABLE 1

| slice_header( ) { | C | Descriptor |
|---|---|---|
| first_mb_in_slice | 2 | ue(v) |
| slice_type | 2 | ue(v) |
| pic_parameter_set_id | 2 | ue(v) |

TABLE 1-continued

| slice_header( ) { | C | Descriptor |
|---|---|---|
|   frame_num | 2 | u(v) |
| /* non-scalable mv coding parameters*/ | | |
|   if (profile_idc == XX && slice_type != I_SLICE && slice_type!=SI_SLICE) | | |
|   { | | |
|     non_scalable_mv_coding_flag | 2 | u(1) |
|   } | | |
| /* end of non-scalable mv coding parameters */ | | |
|   if( !frame_mbs_only_flag ) { | | |
|     field_pic_flag | 2 | u(1) |
|     if( field_pic_flag ) | | |
|       bottom_field_flag | 2 | u(1) |
|   } | | |
|   if( nal_unit_type == 5 ) | | |
|     idr_pic_id | 2 | ue(v) |
|   if( pic_order_cnt_type == 0 ) { | | |
|     pic_order_cnt_lsb | 2 | u(v) |
|     if( pic_order_present_flag && !field_pic_flag ) | | |
|       delta_pic_order_cnt_bottom | 2 | se(v) |
|   } | | |
|   if( pic_order_cnt_type == 1 && !delta_pic_order_always_zero_flag ) { | | |
|     delta_pic_order_cnt[ 0 ] | 2 | se(v) |
|     if( pic_order_present_flag && !field_pic_flag ) | | |
|       delta_pic_order_cnt[ 1 ] | 2 | se(v) |
|   } | | |
|   if( redundant_pic_cnt_present_flag ) | | |
|     redundant_pic_cnt | 2 | ue(v) |
|   if( slice_type == B ) | | |
|     direct_spatial_mv_pred_flag | 2 | u(1) |
|   if( slice_type == P \|\| slice_type == SP \|\| slice_type == B ) { | | |
|     num_ref_idx_active_override_flag | 2 | u(1) |
|     if( num_ref_idx_active_override_flag ) { | | |
|       num_ref_idx_l0_active_minus1 | 2 | ue(v) |
|       if( slice_type == B ) | | |
|         num_ref_idx_l1_active_minus1 | 2 | ue(v) |
|     } | | |
|   } | | |
|   ref_pic_list_reordering( ) | 2 | |
|   if( ( weighted_pred_flag && ( slice_type == P \|\| slice_type == SP ) ) \|\| ( weighted_bipred_idc == 1 && slice_type == B ) ) | | |
|     pred_weight_table( ) | 2 | |
|   if( nal_ref_idc != 0 ) | | |
|     dec_ref_pic_marking( ) | 2 | |
|   if( entropy_coding_mode_flag && slice_type != I && slice_type != SI ) | | |
|     cabac_init_idc | 2 | ue(v) |
|   slice_qp_delta | 2 | se(v) |
|   if( slice_type == SP \|\| slice_type == SI ) { | | |
|     if( slice_type == SP ) | | |
|       sp_for_switch_flag | 2 | u(1) |
|     slice_qs_delta | 2 | se(v) |
|   } | | |
|   if( deblocking_filter_control_present_flag ) { | | |
|     disable_deblocking_filter_idc | 2 | ue(v) |
|     if( disable_deblocking_filter_idc != 1 ) { | | |
|       slice_alpha_c0_offset_div2 | 2 | se(v) |
|       slice_beta_offset_div2 | 2 | se(v) |
|     } | | |
|   } | | |
|   if( num_slice_groups_minus1 > 0 && slice_group_map_type >= 3 && slice_group_map_type <= 5) | | |
|     slice_group_change_cycle | 2 | u(v) |
| } | | |

When non_scalable_mv_coding_flag is equal to 1, this represents that the motion vector (MV) is non-scalable coded for the highest enhancement layer. For a lower layer, the MV needs to be downsampled, which can be implemented with one addition and one right shift, assuming two-layer spatial scalability. The inter prediction process formulae in the H.264 standard is modified as follows:

$$MVL0[mbPartIdx][subMbPartIdx]=(mvL0+1)>>1 \quad (8\text{-}112)$$

$$MvL1[mbPartIdx][subMbPartIdx]=(mvL1+1)>>1 \quad (8\text{-}113)$$

When non_scalable_mv_coding_flag is equal to 0, this represents that the MV is scalable coded. In the enhancement layer, either the base layer MV is upsampled and used as a predictor or the neighbouring MV in the same layer is used as a predictor.

In accordance with the present principles, the MV can be optimally coded to fit, e.g., different applications and decoder requirements.

In one example in accordance with the present principles, also described below with respect to FIG. 13, if base layer H.264 compatibility is desired for the decoder, then MV coding can be selected based on the coarseness of scalability. If for the base layer, only coarse scalability or a lower frame rate is desired, then the decoder may only decode I-slices. Then, non-scalable MV coding can be used for both P and B slices. If the desired frame rate is higher, then P slices can be coded using scalable motion vectors and B slices can be coded using non-scalable motion vectors.

In another example in accordance with the present principles, also described below with respect to FIG. 14, where bitrate scalability is desired, the encoder can use a rate-distortion optimization method to select how the motion vector should be coded. If the decoder will drop B slices for base layer decoding while the encoder codes both P and B slices in the base layer, then the encoder can use scalable motion vector coding for P slices, but non-scalable motion vector coding for B slices to improve the total coding efficiency.

In a third example in accordance with the present principles, also described below with respect to FIG. 15, and directed to complexity scalable coding, since the total bitrate coding efficiency and complexity is a concern, non-scalable motion vector coding is selected for both P and B slices or scalable motion vector coding is used for P slices and non-scalable motion vector coding is used for B slices. Alternatively, scalable motion vector coding can be used for a subset of P slices and non-scalable motion vector coding can be used for the remaining P slices. One possible implementation of the third example is shown in Table 2 of FIG. 18.

Table 2 illustrates an exemplary coding of motion. According to the illustrative embodiment of Table 2 corresponding to the third example above, in the base layer, all P pictures are scalable motion vector coded, but in the enhancement layer, all P pictures are non-scalable motion vector coded.

TABLE 2

| enhancement layer | | P | P | | P | P |
|---|---|---|---|---|---|---|
| base layer | I | | | P | | P |

In another implementation for combing scalable motion vector coding and non-scalable motion vector coding in accordance with the present principles, scalable motion vector coding can be used for the base layer, but non-scalable motion vector coding can be used for higher enhancement layers if more than 2-level spatial scalability is supported.

A description will now be given of some of the many attendant advantages/features of the present invention. For example, one advantage/feature is a spatial scalable video encoder that includes an encoder for performing a selection between scalable coding and non-scalable coding of motion vectors on a slice basis. Another advantage/feature is the spatial scalable video encoder as described above, wherein the encoder performs the selection based on criteria for at least one of an intended application and a decoder to be used for subsequent decoding of the bitstream. Moreover, another advantage/feature is the spatial scalable video encoder that performs the selection based on criteria as described above, wherein the encoder performs the selection based on a decoder specified scalability fineness level for base layer decoding, when the decoder criteria specifies base layer compliant decoding. Further, another advantage/feature is the spatial scalable video encoder that performs the selection based on the decoder criteria and the decoder specified scalability fineness level for base layer decoding as described above, wherein the encoder performs the selection such that the motion vectors in both P and B slices are non-scalable coded or only the motion vectors in the B slices are non-scalable coded with the motion vectors in the P slices being scalable coded. Also, another advantage/feature is the spatial scalable video encoder that performs the selection based on criteria as described above, wherein the encoder performs the selection using a rate-distortion optimization method, when the decoder criteria specifies bitrate scalability. Additionally, another advantage/feature is the spatial scalable video encoder that performs the selection based on criteria and using the rate-distortion optimization method as described above, wherein the encoder performs the selection such that the motion vectors in B slices are non-scalable coded, when the spatial scalable video encoder codes the B-slices in a base layer and the decoder is configured to drop the B slices. Moreover, another advantage/feature is the spatial scalable video encoder that performs the selection based on criteria as described above, wherein the encoder performs the selection such that the motion vectors in both P and B slices are non-scalable coded or only the motion vectors in the B slices are non-scalable coded with the motion vectors in the P slices being scalable coded, when encoding criteria of the spatial scalable video encoder include total bitrate coding efficiency and complexity. Further, another advantage/feature is the spatial scalable video encoder that performs the selection based on criteria as described above, wherein the encoder performs the selection such that the scalable coding is applied to the motion vectors for a base layer and the non-scalable coding is applied to the motion vectors for all enhancement layers, when more than 2-level spatial scalability is supported by the spatial scalable video encoder. Also, another advantage/feature is the spatial scalable video encoder as described above, wherein the encoder adds a syntax field in a slice header to indicate whether a motion vector in a slice is scalable coded or non-scalable coded. Additionally, another advantage/feature is a spatial scalable video decoder for decoding a bitstream, wherein the spatial scalable video decoder includes a decoder for determining whether to use a motion vector coded in the bitstream or to use a quotient of the motion vector divided by a scaling factor, based on a syntax field in a header of the bitstream.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A method for spatial scalable video encoding, comprising selecting between scalable coding and non-scalable coding of motion vectors on a slice basis,
    wherein said selecting step is performed with respect to at least a first option and a second option,
    wherein the motion vectors in both P and B slices are non scalable coded in the first option, and
    wherein only the motion vectors in the B slices are non-scalable coded and the motion vectors in the P slices are scalable coded in the second option.

2. The method of claim 1, wherein said selecting step is performed based on at least one of decoding capabilities of, and decoding criteria utilized for, a target decoder.

3. The method of claim 2, wherein said selecting step is performed based on a decoder specified scalability fineness level for base layer decoding, when the decoding criteria specifies base layer compliant decoding.

4. The method of claim 2, wherein said selecting step is performed using a rate-distortion optimization method, when the decoding criteria specifies bitrate scalability.

5. The method of claim 2, wherein said selecting step is performed such that the motion vectors in B slices are non-scalable coded, when the B-slices are encoded in a base layer and the target decoder is configured to drop the B slices.

6. The method of claim 2, wherein said selecting step is performed such that the motion vectors for a base layer are scalable coded and the motion vectors for all enhancement layers are non-scalable coded, when more than 2-level spatial scalability is supported by a corresponding encoder for implementing the method.

7. The method of claim 1, wherein said selecting step is performed with respect to at least the first option and the second option, when encoding criteria include total bitrate coding efficiency and complexity.

8. The method of claim 1, further comprising adding a syntax field in a slice header to indicate whether a motion vector in a slice is scalable coded or non-scalable coded.

9. A spatial scalable video encoder, comprising an encoder for performing a selection between scalable coding and non-scalable coding of motion vectors on a slice basis,
wherein said encoder performs the selection with respect to at least a first option and a second option,
wherein the motion vectors in both P and B slices are non scalable coded in the first option, and wherein only the motion vectors in the B slices are non-scalable coded and the motion vectors in the P slices are scalable coded in the second option.

10. The spatial scalable video encoder of claim 9, wherein said encoder performs the selection based on at least one of decoding capabilities of, and decoding criteria utilized for, a target decoder.

11. The spatial scalable video encoder of claim 10, wherein said encoder performs the selection based on a decoder specified scalability fineness level for base layer decoding, when the decoding criteria specifies base layer compliant decoding.

12. The spatial scalable video encoder of claim 10, wherein said encoder performs the selection using a rate-distortion optimization method, when the decoding criteria specifies bitrate scalability.

13. The spatial scalable video encoder of claim 10, wherein said encoder performs the selection such that the motion vectors in B slices are non-scalable coded, when the spatial scalable video encoder codes the B-slices in a base layer and the target decoder is configured to drop the B slices.

14. The spatial scalable video encoder of claim 10, wherein said encoder performs the selection such that the scalable coding is applied to the motion vectors for a base layer and the non-scalable coding is applied to the motion vectors for all enhancement layers, when more than 2-level spatial scalability is supported by the spatial scalable video encoder.

15. The spatial scalable video encoder of claim 9, wherein said encoder performs the selection with respect to at least the first option and the second option, when encoding criteria include total bitrate coding efficiency and complexity.

16. The spatial scalable video encoder of claim 9, wherein said encoder adds a syntax field in a slice header to indicate whether a motion vector in a slice is scalable coded or non-scalable coded.

17. A method for spatial scalable video decoding of a bitstream, comprising:
determining whether to use a motion vector coded in the bitstream or to use a quotient of the motion vector divided by a scaling factor, based on a syntax field in a header of the bitstream;
wherein said determining step is performed with respect to at least a first option and a second option;
wherein the motion vector coded in the bitstream is used for both P and B slices in the first option; and
wherein only the motion vector coded in the bitstream is used for the B slices and the quotient of the motion vector divided by the scaling factor is used for the P slices in the second option.

18. A spatial scalable video decoder for decoding a bitstream, comprising:
a decoder for determining whether to use a motion vector coded in the bitstream or to use a quotient of the motion vector divided by a scaling factor, based on a syntax field in a header of the bitstream;
wherein said decoder performs the selection with respect to at least a first option and a second option;
wherein the motion vector coded in the bitstream is used for both P and B slices in the first option; and
wherein only the motion vector coded in the bitstream is used for the B slices and the quotient of the motion vector divided by the scaling factor is used for the P slices in the second option.

* * * * *